Oct. 30, 1962   W. C. MAY ETAL   3,060,899
CONTROL VALVE
Filed June 20, 1960   2 Sheets-Sheet 1
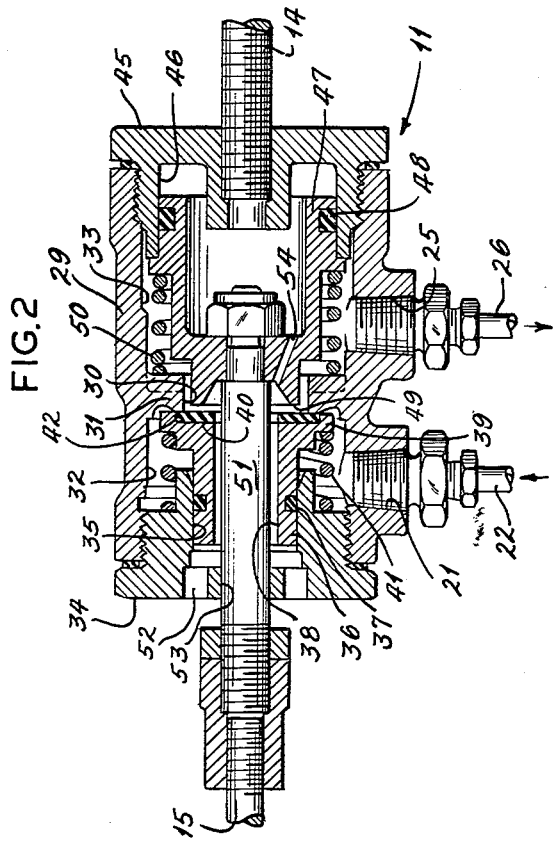
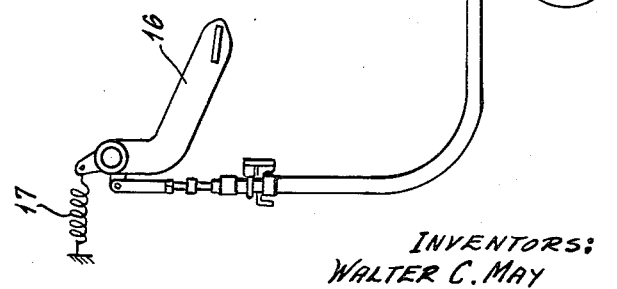
INVENTORS:
WALTER C. MAY
GRAHAM P. RICHARDS
CYRIL B. FITES
By Gravely, Lieder & Woodruff
ATTORNEYS

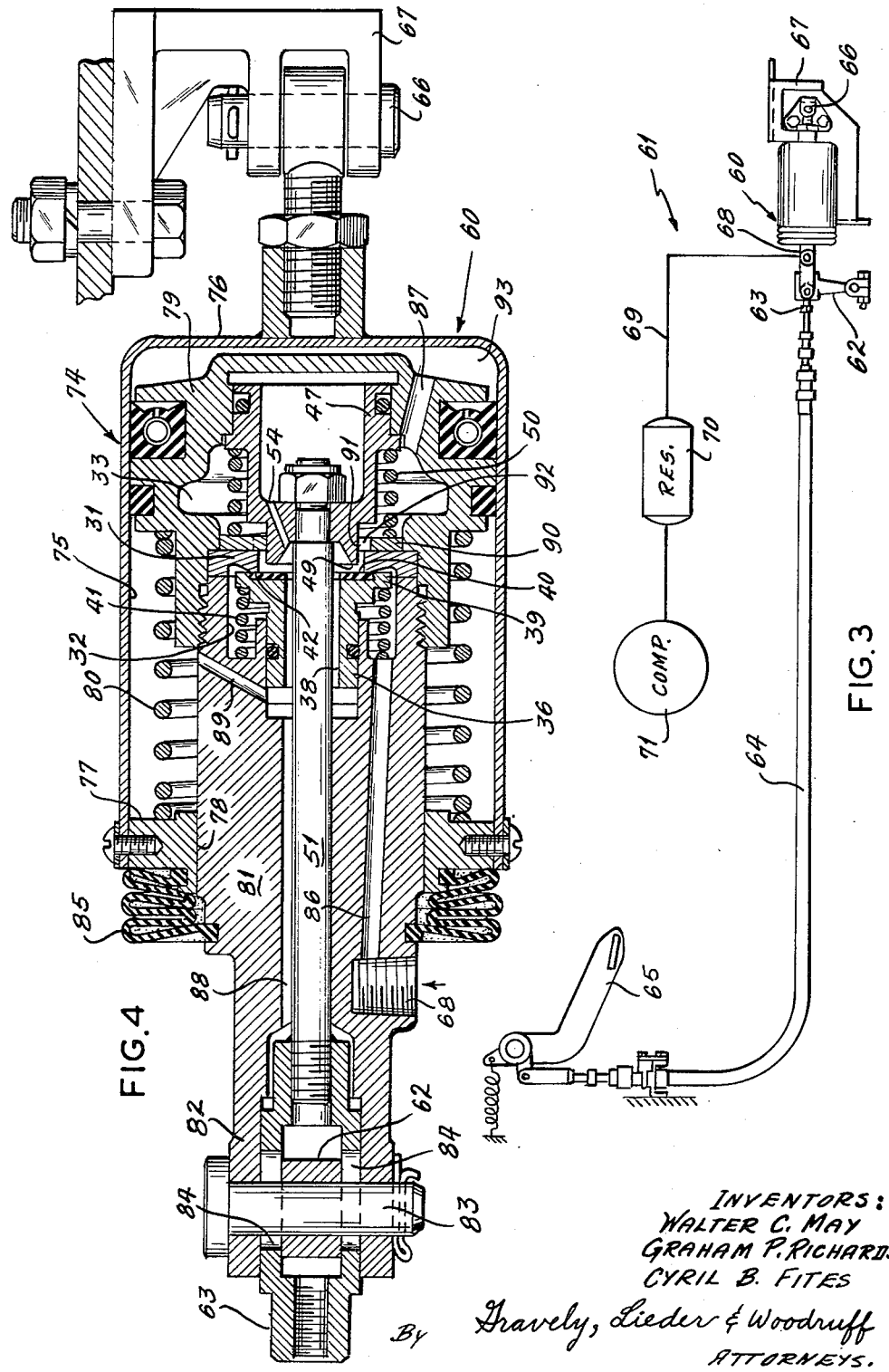

United States Patent Office 3,060,899
Patented Oct. 30, 1962

3,060,899
CONTROL VALVE
Walter C. May, St. Louis, and Graham P. Richards and Cyril B. Fites, St. John, Mo., assignors to Wagner Electric Corporation, St. Louis, Mo., a corporation of Delaware
Filed June 20, 1960, Ser. No. 37,184
12 Claims. (Cl. 121—41)

This invention relates generally to control valves, and more particularly to a follow-up valve for a friction device.

The principal object of the present invention is to provide a control valve for providing rapid and positive response in the operation of a friction device, such as a brake mechanism or a clutch, the valve being adapted to control pressure fluid flow to a power booster and having mechanical operation in the event of power failure.

Another object is to provide a simple, positive acting and economically manufactured control valve.

These and other objects and advantages will become more apparent hereinafter.

The invention is embodied in a control valve for a friction device including a valve casing having inlet and working chambers, a pressure source connected to said inlet chamber and a slave device connected to the working chamber, a valve member normally closing the inlet chamber and venting the working chamber to atmosphere, and manually controlled means engageable with the valve member for sealing the working chamber from atmosphere and establishing communication between the inlet and outlet chambers.

The invention also consists in the parts and in the combinations and arrangements of parts hereinafter described and claimed. In the accompanying drawings which form a part of this specification and in which like numerals refer to like parts wherever they occur:

FIG. 1 is a diagrammatic view of a system in which a preferred valve embodying the invention is utilized, FIG. 2 is a greatly enlarged vertical cross-sectional view of the preferred valve embodiment, FIG. 3 is a diagrammatic view of a system including a modified valve, and FIG. 4 is a greatly enlarged vertical cross-sectional view of the modified valve embodiment.

Referring now to FIG. 1, a fluid pressure system 10 is diagrammatically illustrated for actuating friction devices (not shown) such as the brakes of a motor vehicle. A follow-up or control valve 11 embodying the present invention is shown in the system 10, which also includes an actuating lever 12 adapted to rotate a shaft, cam or the like 13 for actuating a friction device (not shown) of conventional construction. The follow-up valve 11 is connected by a rod or cable 14 to the actuating lever 12 and a typical wire control mechanism or connecting rod 15 connects the valve 11 with a foot pedal 16 having a return spring 17. The lever 12 is also operatively connected with a power cylinder 18, which is pivotally mounted at 19 to a frame member 20. The valve 11 includes an inlet port 21 connected by a conduit 22 through a reservoir 23 to a fluid pressure generating means such as a compressor 24, and an outlet or working port 25 connected by a conduit 26 to the actuating port 27 of a work producing or slave chamber in the power cylinder or booster 18.

Referring now to FIG. 2, the follow-up valve 11 includes a valve casing 29 having a bore 30 defining an annular wall or partition 31 axially positioned between counterbores 32 and 33 forming inlet and working chambers, respectively. The inlet and working ports 21 and 25 are formed in the casing 29 in communication with the chambers 32 and 33. An end cap 34 is threadedly received in the leftward end of the counterbore 32 and has a bore 35 in which an inlet valve member 36 is slidably positioned, a seal 37 being provided between the valve member 36 and the bore wall 35. The inlet valve member 36 is also provided with an axial bore 38 and has an enlarged stepped sealing head 39 on the rightward end thereof, the sealing head including a resilient sealing disc 40. A spring 41 is provided between the end cap 34 and the stepped sealing head 39 and normally urges the valve disc 40 into sealable engagement with a valve seat 42, which is formed on the wall 31 by the juncture of the bore 30 and counterbore 32.

An end cap 45 is threadedly received in the rightward end of the counterbore 33 and is connected by the rod or cable 14 to the friction device actuating lever 12. The end cap 45 has a bore 46 in which a piston 47 is slidably received, a sealing ring 48 being provided between the piston 47 and the bore 46. The piston 47 is provided with an annular valve seat 49 which extends coaxially into the bore 30 and is normally maintained in spaced relation with sealing disc 40 of the sealing head 39 by the action of a return spring 50 urging the piston 47 toward the rightward end cap 45 whereby the valve seat 49 is recessed within the bore 30 from the valve seat 42 of the annular housing wall 31.

A rod member 51 is connected between the wire control 15 and the piston 47 and extends coaxially through the axial bore 38 forming an exhaust passage in communication with atmosphere through spaced openings 52 in the leftward end cap 34. The rod 51 is slidably supported in an opening 53 in the end cap 34 for straight line movement of the piston 47. A pressure equalizing port 54 is formed through the piston member 47 from the cavity formed within the annular valve seat 49 to vent the end cap bore 46 to atmosphere and preventing damping of the movement of the piston 47 therein.

In the normally inoperative condition of the valve 11, the valve member 36 is biased by the spring 41 against the wall 31 to seal the disc 40 on the valve seat 49 and thereby close the inlet chamber 32 from the working chamber 33. The piston 47 is biased to the right against the end cap 45 by the spring 50 to space the valve seat portion 49 thereof from the valve disc 40 and exhaust the working chamber 33 to atmosphere through the passage 38 and openings 52.

In operation, a manual force is applied to the pedal 16 to move the wire control mechanism 15 and the rod 51 leftwardly, and carry the piston 47 toward the valve member 36 against the compressive force of the spring 50. This manually applied force is transferred through the spring 50 to the valve housing or casing 29, end cap 45 and the rod 14 which are moved to the left in a following relation with the piston 47 to initially actuate the lever 12 and take up slack in the friction device. This initial leftward movement of the piston 47 sealably engages the seat 49 with the valve disc 40 to close the exhaust passage 38 and isolate the working chamber 33 therefrom. Further movement of the piston 47 disengages the inlet valve member 36 from the seat 39 of the wall 31 allowing pressure fluid communication between the inlet port 21 and the working port 25. The pressure fluid flows through the conduit 26 to actuate the power cylinder 18 and apply a booster force to the lever 12 in the same direction as the manually applied force. The booster force not only actuates the lever 12 but also serves to move the rod 14 and valve casing 29 leftwardly relative to the piston 47 and inlet valve 36 so that the valve seat 42 is moved to a lapped position with the valve member sealing disc 40 to interrupt pressure fluid communication between the inlet and working chambers 32 and 33 when the desired braking effort is obtained. If greater braking effort is desired, the manual force is increased resulting in the follow-up action of the valve casing 29 to again move into lapped position with the valve member 36.

Upon attaining the desired braking effort, the manually applied force is removed from the pedal 16 and the compressive forces of the springs 41 and 50 move the valve member 36 and piston 47 rightwardly in concert. Initially this rightward movement sealably re-engages the valve sealing disc 40 with the seat 42 to interrupt pressure fluid communication between the inlet and working chambers 32 and 33, and further rightward movement of the piston 47 disengages its seat 49 from the valve sealing disc 40 to establish communication between the exhaust passage 38 and the working port 25 to exhaust the pressure fluid from the power cylinder 18 and de-energize the friction device.

Referring now to FIGS. 3 and 4, it will be seen that a modified embodiment of the invention comprises a novel combination control valve and power booster mechanism 60 in a pressure fluid system 61. In FIG. 3 the system also includes an actuating lever 62 for actuating a friction device (not shown), the lever 62 being connected by a coupler rod 63 to the control mechanism 64 from a spring returned foot pedal 65 also being connected to the coupler rod 63. The control valve and power booster mechanism 60 is pivotally mounted at 66 to a frame member 67. The valve mechanism 60 includes an inlet port 68 connected by a conduit 69 through a reservoir 70 to a fluid pressure generating device, such as a compressor 71.

Referring to FIG. 4, the valve and booster unit 60 is provided with an outer cup-shaped housing 74 having a side wall bore 75 and an end wall 76 mounted by pivot pin 66 to the frame 67. An end plate 77 having an elongated bore 78 is secured to the open end of the housing bore 75. A power piston 79 is slidably positioned in the housing bore 75 and is biased toward the end wall 76 by the force of a return spring 80 interposed between the power piston 79 and the end plate or wall 77. A power piston extension or rod member 81 is removably secured to the power piston 79 and is slidably positioned in the bore 78 of the end member 77. The leftward end of the extension 81 is formed as a clevis or yoke 82 and is connected by a pin 83 to the actuating lever 62. The coupler 63 is received between the arms of the yoke 82 and has elongated slots 84 through which the pin 83 is received. A boot 85 is also provided between the extension 81 and the end plate 77 to prevent the entrance of foreign matter into the housing 74.

The power piston 79 and the extension 81 have cavities 32 and 33 at the adjacent ends where they are secured together, and function as the movable casing for the control valve portion of the mechanism 60. Accordingly, similar numerals in FIG. 2 will be used to identify similar parts in FIG. 4 wherever practical.

The extension bore 32 forms an inlet chamber which is connected by a passage 86 with the inlet port 68 formed in the extension 81, and the power piston cavity 33 forms a working chamber. An outlet or working port 87 is formed through the piston 79 to connect the working chamber 33 with a work producing or slave chamber 93 formed between the closed end 76 of the housing 74 and the end of the power piston 79. An annular wall or partition 31 is provided between the inlet and working chambers 32 and 33. The inlet valve member 36 is slidable in the inlet chamber 32 and has a sealing disc 40 carried on an enlarged head 39 of the valve member 36 for sealing engagement with a valve seat 42 on the annular wall 31 by the action of return spring 41. The valve member 36 has a bore 38 which is in communication with atmosphere through an axial bore 88 formed through the extension 81. A cross-port 89 is also formed in the extension 81 between the axial bore 88 and the leftward side of the power piston 79 in the housing 74.

The cavity or working chamber 33 of the power piston 79 houses a valve piston 47 having an annular valve seat 49 normally spaced from the sealing disc 40 of the valve member 36. A spacer disc 90 having a central opening 91 and radial perforations 92 is slidably received on the valve seat extension of the piston 47 and abuts the annular wall 31, and a spring 50 extends between the spacer 90 and the piston 47 to bias the piston away from the valve member 36. A port 54 is formed through the piston from the cavity defined by the annular valve seat 49 to vent the space to the right of the piston 47 to atmosphere. A connecting rod 51 is provided between the piston 47 and the coupler 63, the rod extending through the axial bore 88 of the power piston extension 81.

In the operation of the embodiment of FIGS. 3 and 4, a manual force is applied to the pedal 65 to move the wire control mechanism 64 and the coupler 63 and rod 51 leftwardly to carry the piston 47 toward the valve member 36 against the compressive force of the spring 50. This manually applied force is transferred through the spring 50 to the seating member or wall 31 and extension 81 so that the power piston 79 and extension 81 are moved to the left in follow-up relation to initially actuate the lever 62 and take up slack in the friction device. This initial leftward movement of the piston 47 sealably engages the seat 49 with the sealing disc 40 to close the exhaust passage 38 and 88 and isolate the working chamber 33 therefrom. However, the right-hand side of the piston 47 remains in communication with the passage 38 through the port 54 and the left-hand side of the power piston 79 is in communication with the passage 88 through port 89. Further movement of the piston 47 disengages the sealing disc 40 from the valve seat 42 of the seating member 31 allowing pressure fluid flow from the inlet port 68 through the extension passage 86 and counterbore 32 around the seating member head 39 into the working chamber 33 and port 87 to the chamber 93 in the power cylinder housing 74 at the closed end 76. In this manner, the fluid pressure acts on the effective area of the power piston 79 creating a booster force which acts in the same direction as the manual force to move said power piston 79 and extension 81 leftwardly and actuate the lever 62. The booster force not only actuates the lever 62 but also moves the power piston and extension leftwardly relative to the piston 47 and inlet valve 36 so that the valve seat 49 is moved into a lapped position with the sealing disc 40 to interrupt pressure fluid communication between the inlet and working chambers 32 and 33. If greater braking effort is desired, the manual force is increased resulting in the follow-up action of the power piston 79 and extension 81 to again move the seating member 31 into a lapped position with the inlet valve member 36.

Upon attaining the desired braking effort, the manually applied force is removed from the pedal 65 and the compressive forces of the springs 41 and 50 move the valve 36 and piston 47 rightwardly in concert. Initially this rightward movement sealably re-engages the valve seating disc 40 with the valve seat 42 of the seating member wall 31 to interrupt pressure fluid communication between the inlet and working chambers 32 and 33 and further rightward movement of the piston 47 disengages its seat 49 from the sealing disc 40 to open the exhaust passage 38. Accordingly, the fluid pressure in the power cylinder housing bore 75 is exhausted to atmosphere through the power piston working port 87 and counterbore 33. Upon exhaustion of the pressure fluid from the power cylinder housing bore 75, the compressive force of the spring 80 returns the power piston 79, the extension 81 and parts associated therewith to normal inoperative position. When the piston 47 unseats the valve 36 during actuation of the friction device (not shown), the pressure fluid acting on the effective area of the piston 47 establishes a reaction force in opposition to the manual force applying the foot pedal which will provide "feel" to the operator.

The present control device, FIGS. 2 and 4, is provided to operate a friction device such as a brake and a power booster is utilized to carry the principal work load. A manual application operates the valving 47, 36 through a lost-motion connection to apply fluid pressure to the booster or work producing chamber 18 (FIG. 1), 93 whereby direct power actuation of the lever 12 (FIG. 1), 62 (FIG. 3) is effected. In the event of power failure, the operator is provided mechanical means to manually energize the friction device. In FIGS. 1 and 2, a manually applied force on the pedal 16, in the event of a power failure, is transmitted through the control mechanism 15 and the rod 51 to actuate the valving 47, 36 and move the piston member 47 leftwardly into abutment with the shoulder formed by the junction of the bore 30 and the counterbore 33. Accordingly, the leftward piston movement is transmitted to the casing 29 and the rod 14 to rotate the lever 12 and manually energize the friction device. In FIGS. 3 and 4, a manual force applied to the pedal 65 is transmitted through the control mechanism 64 and the coupler rod 63 to move the rod member 51 and the valving 47, 36 leftwardly. Accordingly, the leftward piston movement is transmitted through the spacer 90 and annular wall 31 to the casing 79, 81 to rotate the lever 62 and manually energize the friction device. However, the elongated slots 84 of the coupler member 63 may be formed to move into abutment with the pin 83 to rotate the lever 62 and manually energize the friction device.

It is now apparent that a novel control valve meeting the objects set out hereinbefore is provided, and that changes and modifications in the disclosure may be made by those skilled in the art without departing from the spirit of the invention as defined by the claims which follow.

What we claim is:

1. A control valve for a friction device comprising a casing having first and second axially positioned counterbores spaced apart by a radially-extending annular wall with a central bore, said wall forming a casing valve seat in said first counterbore, end closures for said casing, a valve member slidable in the end closure for said first counterbore and spaced from the casing adjacent to said annular wall to define an inlet chamber therebetween, fluid pressure generating means connected to said inlet chamber, valve spring means normally sealing said valve member on said casing valve seat, a piston member slidable in the end closure for said second counterbore and spaced from said casing to define a working chamber therebetween, a work producing chamber connected to said working chamber, said piston having an annular valve seat positioned in said central bore and adapted to be moved into sealed contact with said valve member inwardly of said casing valve seat, piston spring means normally urging said piston valve seat away from said valve member, said valve member having a bore therethrough receiving manually operable means for moving said piston member toward said valve member, said bore forming an exhaust passage in communication with said working chamber past said piston valve seat, said piston member being movable against the force of said piston spring means to seal said piston valve seat on said valve member and close off communication between said exhaust passage and working chamber and then to unseat said valve member from said casing valve seat against the force of said valve spring means whereby said casing is moved in a follow-up relation with said piston and valve members, and said casing being operatively connected with actuating means for a friction device.

2. In a friction device operating mechanism including a friction device having an actuating lever, a control valve responsive to manual actuation for providing lost-motion mechanical and power actuation of said lever, said control valve comprising a valve casing connected to said lever, said valve casing having a counterbore housing a valve member and forming therewith an inlet chamber, a fluid pressure generating means connected to said inlet chamber, said valve casing having another counterbore housing a piston member and forming therewith a working chamber, a slave chamber connected to said working chamber, an annular wall extending radially inwardly from said casing intermediate said inlet and working chambers and a casing valve seat formed on said wall, a first spring between said casing and valve member normally seating the latter on said casing valve seat, an axial bore through said valve member providing an exhaust passage for venting said working chamber to atmosphere, a manually operable rod connected to said piston member extending outwardly of said casing through said axial bore, a second spring between said casing and said piston member urging the latter into spaced relation with said valve member, said rod being operable to move said piston member through a lapped position sealing said exhaust passage from said working chamber to an operable position unseating said valve member and providing pressure fluid communication through said inlet and working chambers to said slave chamber for power actuation of said lever, and the movement of said piston and valve members relative to said casing exerting a spring force to move said casing relative to said piston and valve members and providing lost-motion mechanical actuation of said lever.

3. The control valve according to claim 2 wherein said valve casing is slidably positioned in a housing and comprises a piston in said slave chamber.

4. In a friction device operating mechanism including a friction device, a control valve comprising a casing having inlet and working chambers, a pressure source connected to said inlet chamber, servo motor means adapted to actuate the friction device and including a pressure fluid chamber connected to said working chamber, a valve member disposed entirely within said inlet chamber and having a normal position closing said inlet chamber from said working chamber, exhaust port means in said valve member normally venting said working chamber to atmosphere, control means having a normal position spaced from said valve member and adapted to be moved into sealing contact with said valve member to seal said exhaust port means in said valve member from said working chamber and to move said valve member to provide communication between said inlet and working chambers, first and second spring means urging said valve member and control means toward the normal positions thereof, and means for moving said control means in opposition to the force of said second spring means to close said exhaust port means in said valve member from said working chamber and to open said valve member in opposition to the force of said first spring means to provide communication between said inlet and working chambers, said casing being coupled to said friction device and being movable in follow-up relation with said control means for actuating said friction device.

5. A control valve according to claim 4 in which said servo motor means is separate from said control valve casing and is coupled directly to said friction device for actuation thereof in response to pressure fluid communication being established between said inlet and working chambers of said casing.

6. A control valve according to claim 4 in which said casing comprises a power piston positioned in the pressure fluid chamber of said servo motor means, and said power piston being movable in follow-up relation with said control means in response to fluid pressure in said pressure fluid chamber when pressure fluid communication is established between said inlet and working chambers of said casing.

7. A control valve comprising a housing having spaced chambers therein, a first valve seat in one of said chambers and having a passage formed therethrough between said chambers, an inlet port in said one chamber and an outlet port in the other of said chambers, valve means disposed entirely within said one chamber normally engaging said valve seat and interrupting communication between said inlet and outlet ports, exhaust passage means in said valve means normally venting said outlet port to atmosphere, and valve control means in said other chamber and having a second valve seat movable through said passage into engagement with said valve means to close said exhaust passage means to interrupt communication between said outlet port and atmosphere and to disengage said valve means from said first valve seat to establish communication between said inlet and outlet ports.

8. The control valve according to claim 7 wherein said housing includes a valve bore connecting with said one chamber, and said valve means includes a sleeve portion slidable in said valve bore and a sealing head portion normally engaged with said first valve seat, the cross-sectional areas of said sleeve portion of said valve means and said second valve seat of said valve control means being substantially equal.

9. The control valve according to claim 7 including a valve casing member fixedly received in said housing and forming an end wall portion of said one chamber, a bore in said valve casing member axially aligned with said passage, said valve means including a sleeve portion slidable in said valve casing member bore and a sealing head portion normally engaged with said first valve seat, the cross-sectional area of said sleeve portion of said valve means and said second valve seat of said valve control means being substantially equal and less than the cross-sectional area of said passage.

10. In a friction device operating mechanism including a friction device, a servo motor for energizing said friction device, and a control valve for actuating said servo motor comprising a movable casing coupled to said servo motor, spaced chambers in said casing, a wall connected with said casing between said chambers, a passage in said wall between said chambers, an inlet port in one of said chambers connected with a pressure fluid source and an outlet port in the other of said chambers connected with said servo motor, valve means slidably positioned entirely within said one chamber and normally engaged with said wall about said passage to interrupt communication between said inlet and outlet ports, exhaust passage means in said valve means normally in open communication with said passage in said wall to establish communication between said outlet port and atmosphere, and valve control means slidable in said other chamber and extending into said passage in said wall, said valve control means being movable into sealed engagement with said valve means to close said exhaust passage means interrupting communication between said outlet port and atmosphere and to disengage said valve means from said wall to establish pressure fluid communication between said inlet and outlet ports to actuate said servo motor, said casing and wall being movable in follow-up relation with said valve means and valve control means in response to actuation of said servo motor.

11. A friction device operating mechanism comprising a cylinder, a power piston assembly including a housing slidable in said cylinder and having a working end extending exteriorly of said cylinder, an expansible chamber formed between said housing and cylinder, spaced chambers in said housing, abutment means between said housing chambers and connecting with said housing, a passage in said abutment means interconnecting said housing chambers, an inlet port in one of said housing chambers and an outlet port in the other of said housing chambers, said outlet port being in open pressure fluid communication with said expansible chamber, a valve seat on said abutment means circumscribing said passage, valve means slidable in said one housing chamber and normally engaged with said valve seat to interrupt pressure fluid communication between said inlet and outlet ports, an exhaust passage in said valve means normally establishing pressure fluid communication between said outlet port and atmosphere, valve control means slidable in said other housing chamber, actuating means extending through said exhaust passage means in said valve means and said passage of said abutment means and being secured to said valve control means, said valve control means being movable in response to an applied force on said actuating means into sealing engagement with said valve means to close said exhaust passage and interrupt pressure fluid communication between said outlet port and atmosphere and to disengage said valve means from said valve seat to establish pressure fluid communication between said inlet and outlet ports, said housing being responsive to fluid pressure in said expansible chamber to move the working end thereof in a work producing direction and to move said abutment means and valve seat in follow-up relation with said valve means.

12. In a friction device operating mechanism including a friction device having an actuating lever, a control valve comprising a movable valve casing connected to said actuating lever, said casing having inlet and working chambers and a peripheral wall intermediate said chambers forming an annular casing valve seat in said inlet chamber, fluid pressure generating means connected to said inlet chamber, a slave power chamber connected to said working chamber, a valve member disposed entirely within said inlet chamber, first spring means between said casing and valve member urging the latter into sealed engagement with said annular casing valve seat in inoperative position to prevent communication between said inlet and working chambers, an exhaust passage in said valve member radially inwardly of said valve seat engaging portion, a piston member in said working chamber including an annular piston valve seat having an inoperative position forming a lost-motion connection with said valve member in circumscribing relation with said exhaust passage, second spring means between said casing and piston member urging the latter toward inoperative position, said working chamber being vented through said exhaust passage when said piston member is in inoperative position, and manual means for moving said piston member against the action of said second spring means to a lapped position with said valve member in which position said exhaust passage is sealed from said working chamber and said working chamber is sealed from said inlet chamber and for further moving said piston member to an operative position in which position said valve member is moved from said casing valve seat against the biasing action of said first spring means to establish communication between said inlet and working chambers whereby said first and second spring means move said casing in a following relation with said piston and valve members to actuate said lever.

References Cited in the file of this patent
UNITED STATES PATENTS

| | | |
|---|---|---|
| 2,761,427 | Shumaker | Sept. 4, 1956 |
| 2,842,101 | Price | July 8, 1958 |
| 2,997,028 | Ayers | Aug. 22, 1961 |

FOREIGN PATENTS

| | | |
|---|---|---|
| 424,653 | Italy | Aug. 28, 1947 |